United States Patent [19]
Seragnoli

[11] 3,912,123
[45] Oct. 14, 1975

[54] DEVICE FOR COORDINATING AND FEEDING SEPARATELY OBJECTS, PARTICULARLY SWEETS AND SIMILAR, TO A WRAPPING MACHINE

[75] Inventor: Enzo Seragnoli, Bologna, Italy

[73] Assignee: G. D. Societa in Accomandita Semplice di Enzo Seragnoli e Ariosto Seragnoli, Italy

[22] Filed: Jan. 2, 1974

[21] Appl. No.: 430,144

[30] Foreign Application Priority Data
May 9, 1973 Italy.................................... 3398/73

[52] U.S. Cl................................................ 221/237
[51] Int. Cl............................................ B65g 47/26
[58] Field of Search ........... 221/225, 237, 233, 265, 221/162; 198/31 AA, 31 R

[56] References Cited
FOREIGN PATENTS OR APPLICATIONS
574,524   4/1957   Italy.................................... 221/237

*Primary Examiner*—Stanley H. Tollberg
*Attorney, Agent, or Firm*—Robert E. Burns; Emmanuel J. Lobato; Bruce L. Adams

[57] ABSTRACT

Disclosed herein is a device for coordinating and feeding separately objects, particularly sweets and similar, to a wrapping machine, comprising a plurality of distribution units in the form of discs with peripheric holes and a conveyor unit, again of a disc shape, which is also provided with peripheric holes.

The said device is equipped with suitable means for causing the said discs to rotate intermittently and for the rotation to be punctuated with stops.

The frequency of the movement given to the conveyor disc is n times greater than that given to the distribution discs, the movement of which is contemporaneous.

The holes in the distribution disc and in the conveyor disc align during their coinciding stops, the purpose of this being to enable the objects to be transferred from the distribution discs to the conveyor disc.

The way in which the stopping and starting times of the various units have been calculated results in it being easy both for the objects to be inserted into the holes in the distribution discs and for them to be transferred into those in the conveyor disc. It also makes it possible for the speed at which the objects are wrapped to undergo a very considerable increase.

3 Claims, 3 Drawing Figures

DEVICE FOR COORDINATING AND FEEDING SEPARATELY OBJECTS, PARTICULARLY SWEETS AND SIMILAR, TO A WRAPPING MACHINE

BACKGROUND OF THE INVENTION

This invention relates to devices for coordinating and feeding separately objects, particularly sweets and similar, to a wrapping machine.

DESCRIPTION OF THE PRIOR ART

Devices have been know for some time with which to coordinate and feed separately objects, particularly sweets and similar, to a wrapping machine and these are provided with a disc that rotates intermittently and is surrounded, fully or in part, by a fixed enclosure in such a way as to form a basin, with the rotating disc constituting the base, into which the objects are poured in bulk.

The said disc, called a distribution plate, has on its periphery a rim with holes in it, each of which is shaped to accept and house an object to be fed to the wrapping machine.

The actual task of infeeding the objects to the wrapping machine is entrusted to a second disc, called a conveyor plate, which also has on its periphery a rim with holes in it and is moved intermittently at the same frequency as the distribution plate and in synchronization with it.

The distribution plate and the conveyor plate are mounted in such a way that the holes in the former come, individually and in succession, into vertical alignment, at a transfer station when both plates are at a standstill, with the individual holes in the conveyor plate.

In this way, an object can be transferred from a hole in the distribution plate to a hole in the conveyor plate, ready to be infed at another station, during a subsequent contemporaneous halt on the part of the two plates, to the wrapping machine.

With said devices it has been possible to achieve a production speed of 200–250 wraps per minute Subsequently the necessity has been seen of matching the speed of the said devices to the potentially higher speeds of the wrapping machines and since one of the limits to this is constituted by the amount of time needed for the objects to drop into the holes in the distribution plate and settle themselves properly therein, which cannot be suitably shortened, the system has been adopted of having a plurality of the said distribution plates in conjunction with the conveyor plate, so as to have, in the same time span as above, a greater number of objects housed in the holes in the distribution plates.

If, by way of an example, consideration is henceforth given to the more simple and constructionally more suitable method of having two distribution plates, it is obvious that in order to fill all the holes in the conveyor plate, the two distribution plates need only to have a rotation frequency half that of the conveyor plate, provided that each time they move, the two plates rotate sufficiently to cover the distance between two successive holes.

As a logical consequence of the above mentioned idea, wrapping machine infeed devices have been designed wherein the frequency of the intermittent motion of the distribution plates is reduced in an inverse proportion to their number.

The transfer operation from the two distribution plates to the conveyor plate can take place, in accordance with conventional methods, either with one single object each time the conveyor plate pauses, with the object being taken from one or the other of the two distribution plates, by means of units that operate alternately, or with two objects at a time, using means that operate in a synchronized fashion.

It has been seen, however, that whilst the devices with two distribution plates, based on the above mentioned method, have the advantage of making better use of the time required to position the products in the holes in the distribution plates, they do not solve the problems connected with the many obstacles that have to be overcome in order to get bulk poured objects to be properly seated in holes tailored to suit them.

Based on the simple observation that an increase in the amount of time used to move the distribution plates and a decrease in that allotted per cycle to their pauses, can favour the said problem being solved, in U.S. Pat. No. 2,995,234 it was proposed that the distribution plates be given a multiple number of intermittent movements in comparison with the number strictly necessary to fill all the holes in the conveyor plate, that is to say, that each time they move, the said plates rotate sufficiently to cover a fraction of the distance between two successive holes.

In actual practice, however, it has been seen that whilst with this expedient to increase the movement frequency of the distribution plates it becomes easier, on one hand, to get the objects to fit into the holes, on the other, the continual and not easily limitable variations in angular velocity can cause them to be displaced.

At this juncture, through a completely new way of looking at the problem and after laborious studies, the applicant turned towards a different way of solving matters.

So far, as has been seen, the movement of the distribution plates has been considered and assessed solely in terms of frequency, that is to say, the number of movements of the said plate referred, in the span of one cycle, to the movement frequency of the conveyor plate, since the said movements are punctuated by stops during which the transfer of an object to the conveyor plate takes place.

The applicant, therefore, focused attention on the laws of motion with which it is possible to create the best conditions for overcoming the various critical points in the problem and, first of all, for getting the objects to go into the holes in the distribution plate and position themselves properly and, secondly, for enabling there to be a considerable increase in the speed of the device in question.

A development of this idea has been to coordinate the intermittent movements of the distribution plate and of the conveyor plate, using laws of motion which although different, are such that it is possible to get the said plates to stop in unison with their holes vertically aligned and this has been done by giving the distribution plate brief pauses and long movement times per cycle, sufficient to guarantee the objects fitting into the holes and the conveyor plate, brief movement times and longer pauses, sufficient for the operations of removing from it the objects and of feeding them to the wrapping machine.

The above mentioned idea, which has enabled the output per minute to be increased up to 800–1000 wraps, has been applied in U.S. Pat. No. 3,625,337 assigned to the assignee hereof.

According to the said invention, the distribution plate is provided with two concentric rims of holes and the objects are transferred two at a time from these to the conveyor plate and thence, using conventional systems, to the wrapping machine.

When setting up the said device certain difficulties were, however, experienced since, because of the different peripheric speeds, the said ideal conditions for getting the products properly seated in the holes in the distribution plate could only be achieved for one or the other of the two rims of holes.

As a result of this, some of the holes in the distribution plate remained empty to the consequential detriment of the normal operation of the device in question and of the wrapping machine.

Various attempts have been made to overcome this problem, such as, for example, that mentioned in U.S. Pat. No. 3,625,337, which envisages identical operating conditions for both rims of holes by having a channel for infeeding the objects separately to each of the said rims, with a fixed wall interposed between them.

Despite all this it has not been possible, however, to fully overcome the problem to which reference has been made above and this is on account of the difference in the peripheric speed conditions under which the two rims of holes have to operate, about which nothing can be done.

SUMMARY OF THE INVENTION

The main object of the invention is, therefore, to overcome the aforementioned difficulties caused by the difference in the operating conditions of the two rims of holes, by creating a device in which the idea of different laws of motion can be best applied concomitantly with the best and most rational use of the time required for the objects to drop into the holes in a distribution plate and settle properly therein.

A further object of the present invention is to create a device with which to realize the foregoing by means of a structure which is particularly simple, easy and trouble free, as well as, above all, cheap in cost compared with its notable efficiency.

These and other objects still are all achieved with the device according to the invention for coordinating and feeding separately objects, particularly sweets and similar, to a wrapping machine, essential features of which are: a plurality of $n$ distribution units and one conveyor unit, each of the said units having a plurality of equidistant peripheric holes; means for cyclically operating the said conveyor unit and the said $n$ distribution units so that the start/stop frequency ratio per cycle is $n:1$ and that the distribution units have long movement times and brief pauses and the conveyor units has brief movement times and long pauses.

BRIEF DESCRIPTION OF THE DRAWINGS

Further characteristics and advantages of the invention will emerge more clearly from the following detailed description of a preferred but not the sole form of embodiment for the device in question, illustrated purely as an example on the accompanying drawings in which.

DESCRIPTION OF THE PREFERRED EMBODIMENT

Figure 1:
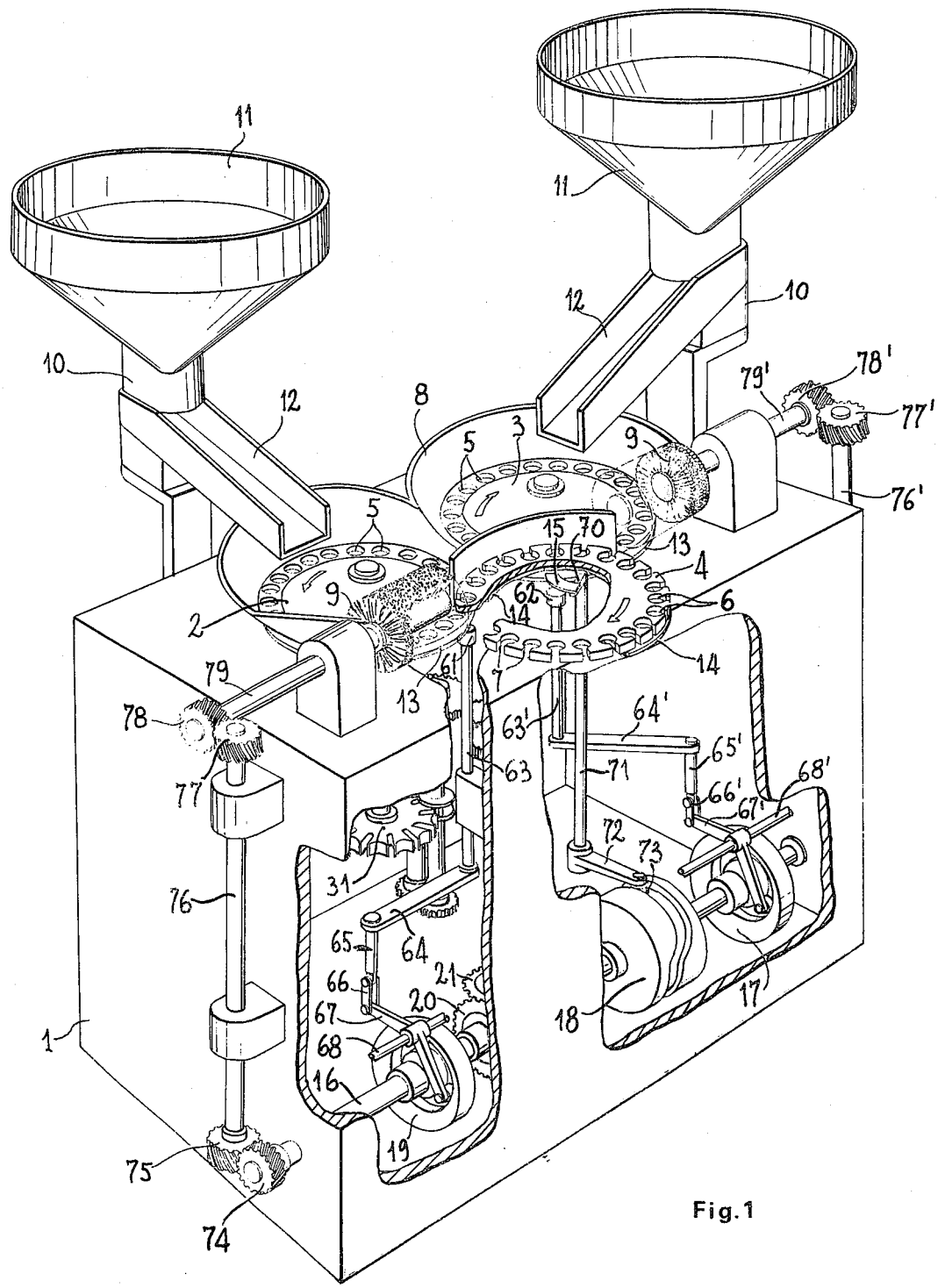
FIG. 1 shows the device, in a perspective view, with certain parts in sectional form so that others can be better seen, with particular emphasis being given to the parts with which the objects to be supplied to the wrapping machine are handled.
Figure 2:
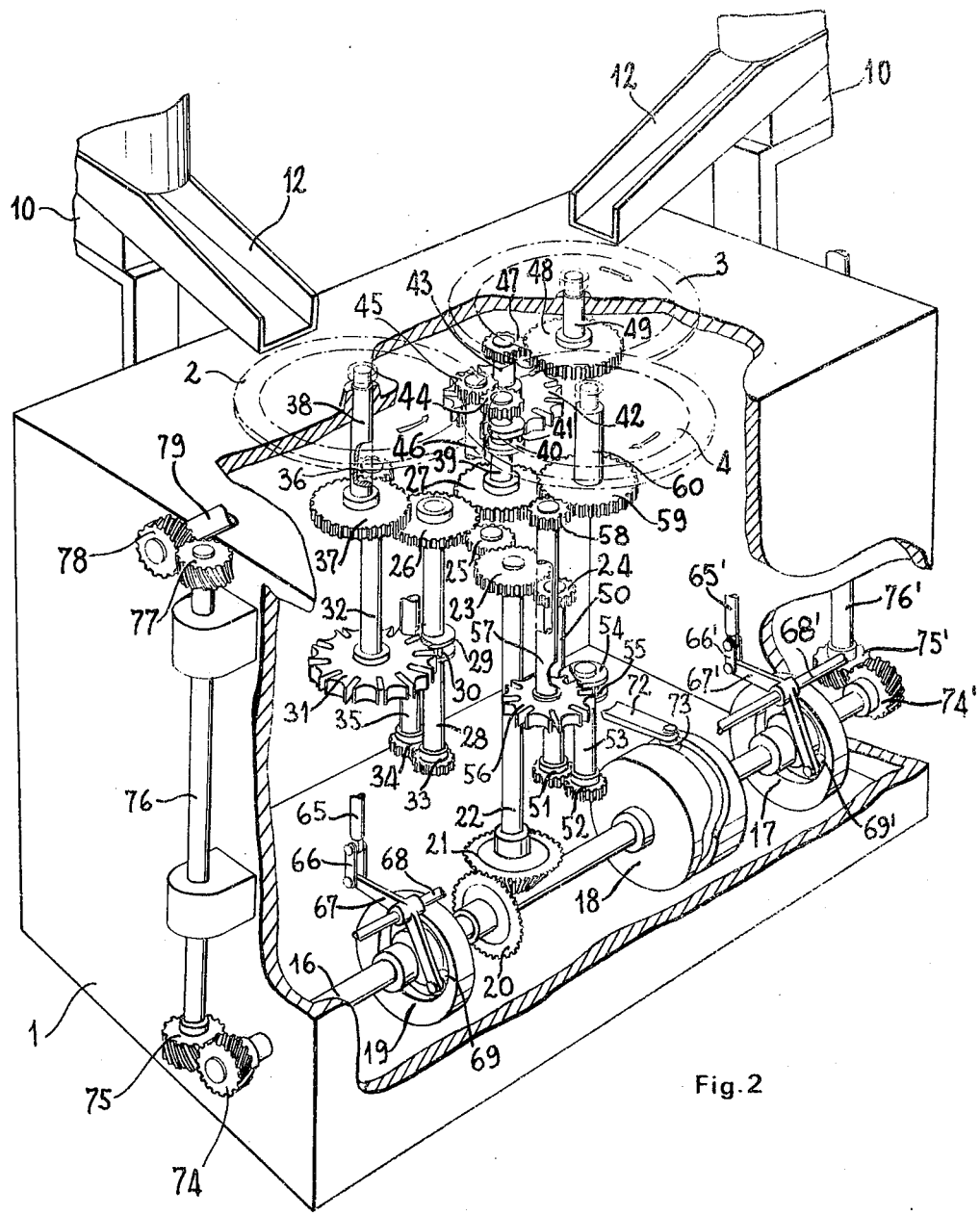
FIg. 2 shows the device, again in a perspective view, with certain parts in sectional form so that others can be better seen, with particular emphasis being given to the parts that supply and transmit the drive to the entire device.

From FIGS. 1 and 2 it can be seen that the device shown has a frame 1 which can either be connected to or is a part of the frame of the wrapping machine. The latter is not shown in the accompanying drawings since it is not within the scope of the present invention.

The said frame supports, in a known fashion, the plates 2, 3 and 4 which are rotatable around vertical shafts and are operated with an intermittant motion by the means described in detail hereinafter.

The said plates are mounted in such a way that the plate 4, rotatable in a clockwise direction, is partly superposed on the plate 2, the rotation of which is anti clockwise and the plate 3, the rotation of which is clockwise.

The said plates 2 and 3 act as distribution plates and both are provided with a peripheric rim of equidistant holes 5, whilst the plate 4 is a conveyor plate which also has a rim of equidistant holes 6 on its periphery and these have a radial indentation in them which opens outward.

Furthermore, the said plates 2 and 3 have running round them a single section of fixed wall 8 which, jointly with the two rotating brushes 9, one per distribution plate, constitutes two basins for charging the objects in bulk, for which the plates 2 and 3 represent the moving base.

The said fixed wall 8 does not extend to the peripheric areas of the plates 2 and 3 where the plate 4 is superposed as it rotates.

The objects being handled are fed in bulk to the two distribution plates 2 and 3 by means of two normal devices, each of which is constituted by vibrator means 10, a hopper 11 and a charging channel 12.

In a position below the holes in the plates 2 and 3 there are two fixed surfaces 13 which extend to the area where the plate 4 is superposed on the above mentioned plates 2 and 3 and these close the holes at a point corresponding to where, as will be seen in due course, the individual products are transferred to the conveyor plate 4.

A fixed surface 14 also runs underneath the holes 6 in the plate 4 and this closes in the aforementioned areas where the plate 4 is superposed on the plates 2 and 3, that is to say, the area where the objects are transferred from the distribution plates to the conveyor plate. The said fixed surface 14 stretches to the vicinity of a station where a unit for feeding the objects arriving there to the wrapping mechanism of the machine, is located.

At the point where the plate 4 is superposed on the plate 3, the said fixed surface 14 is replaced by an oscillating plate 15, more about which will be said later on.

Although the distribution plates 2 and 3 and the conveyor plate 4 are given an intermittant rotatory movement, the law of motion in respect of the two plates 2 and 3 differs, as will be seen from the ensuing description, from that for the plate 4.

With the present invention, the drive is taken from the horizontal main shaft 16, supported by the frame 1, which is either operated independently or else by the wrapping machine.

Figure 3:
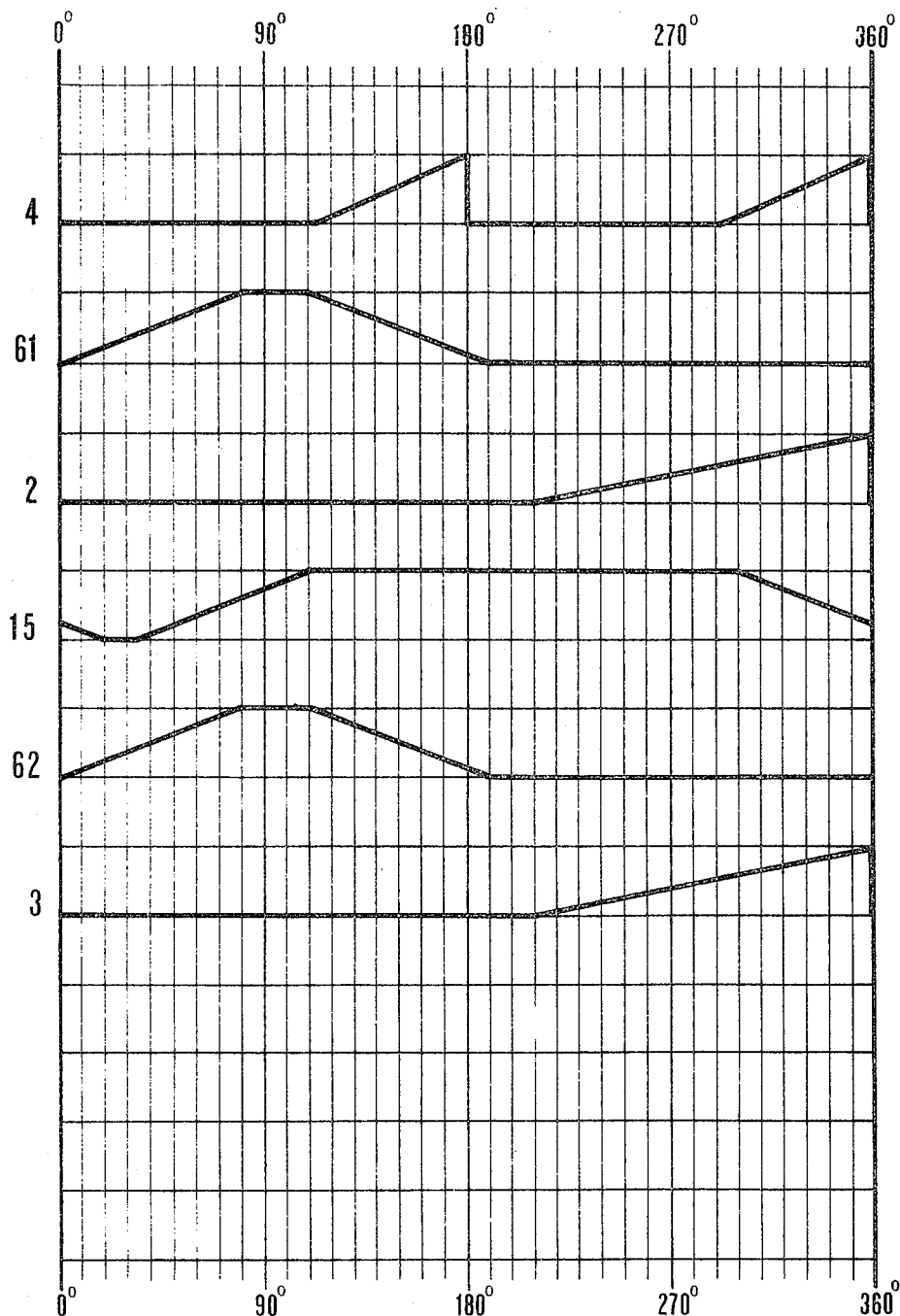
FIG. 3 shows, in graph form, the operating phases relevant to one machine cycle, in respect of the working parts used to coordinate and transfer the objects.

Each revolution of the said shaft 16 is conventionally considered to correspond to one machine cycle, that is to say, one machine cycle corresponds to a rotation of the said shaft 16 through 360°, as shown in the graph in FIG. 3.

The said shaft 16, on which are mounted the cams 17, 18 and 19, the purpose of which will be explained, transmits its movement to a vertical shaft 22 via a crown wheel and pinion 20 and 21, respectively.

The upper end of the said shaft 22 is keyed to a gear 23 which transmits the movement to a gear 24 and, via an idle gear 25, to a gear 26.

The ratio between the number of teeth in the gear 23 and those in gear 24 is 2:1, whilst the ratio between the number of teeth in the said gear 23 and those in the gear 26 is 1:1.

The result of this is that each time the gear 23 rotates through 360°, the gear 24 performs two complete revolutions, whilst the gear 26 also revolves once through 360°.

In turn, the gear 26 transmits the rotatory movement on to the gear 27 which has an identical number of teeth and is integral with the shaft 28 which is consequentially made to rotate.

Half way along the said shaft 28 there is a contrivance 29 of a known type and this comprises a vertical axis idle roller 30 and, in a diametrically opposed position, an arcuated or centering device (not shown on the drawings). The purpose of the said contrivance 29 is to cause a twelve compartment Geneva mechanism 31 to rotate around its vertical shaft 32.

The lower end of the shaft 28 has rigidly mounted on it a gear 33 which meshes with a gear 34 thereby causing the vertical shaft 35 to rotate and since the angular velocities are high, this acts as a second centering device for the Geneva mechanism 31, in conformity with what is stated in U.S. Pat. No. 3,605,517 in the name of the same applicant as herein.

The Geneva mechanism 31 which, on account of its known characteristics is given an intermittent rotatory movement, is integral with the vertical shaft 32, the upper extremity of which carries a gear 36 which meshes with a gear 37 rigidly carried by a shaft 38.

The upper end of the said shaft 38 is integral, on the outside of the frame 1, with the distribution plate 2.

The previously mentioned gear 27 causes a shaft 39 on which it is mounted, to rotate. The said shaft 39 which because of what has already been stated, undergoes a 360° revolution each time the gear 26 rotates, has a contrivance 40 of the previously described type mounted half way along it and this comprises a vertical axis idle roller 41 and, in a diametrically opposed position, an arcuated or centering device (not shown on the drawings).

The said contrivance 40 has the task of causing the twelve compartment Geneva mechanism 42 to rotate around its vertical shaft 43.

A gear 44 is fixedly mounted on the upper end of the shaft 39 and this, through a gear 45, causes the rotation of a vertical shaft 46, the task of which, as already previously seen, is to act as a second centering device for the Geneva mechanism 42.

The upper end of the shaft 43 has keyed on to it a gear 47 which meshes with a gear 48 fixedly mounted on a shaft 49, the upper end of which is integral, on the outside of the frame 1, with the second distribution plate 3.

The previously mentioned gear 24 which has a teeth ratio of one half with respect to the drive gear 23, is integral with the shaft 50 on the lower end of which is mounted a gear 51 and this causes the rotation of a gear 52, provided with the same number of teeth, which, in turn, is integral with a vertical shaft 53 on the upper end of which, exactly as previously seen, there is a contrivance 54 of a known type, comprising a vertical axis idle roller 55 and, in a diametrically opposed position, an arcuated or centering device (not shown on the drawings).

The said contrivance 54 causes the rotation of an eight compartment Geneva mechanism 56 around a shaft 57 on which it is mounted. In the latter instance, the second centering function for the Geneva mechanism 56 is carried out by the aforementioned shaft 50. The upper end of the shaft 57 is keyed to a gear 58 which meshes with a gear 59 and this, in turn, is integral with the lower end of a shaft 60.

The opposite end of the said shaft 60 is integral, on the outside of the frame 1, with the conveyor plate 4.

In conformity with the description given herein and on the basis of what can be seen from the graph in FIG. 3, in the span of one cycle, corresponding to a rotation through 360° of the shaft 16, the two Geneva mechanisms 31 and 42 inch once and the distribution plates 2 and 3 take their intermittent motion from this. Likewise, during the same cycle, the Geneva mechanism 56 from which the conveyor plate 4 takes its motion, inches twice.

Furthermore, it should be noted that the ratio between the number of teeth in the two gears 36 and 37 for the distribution plate 2 and the same ratio referred to the gears 47 and 48 for the distribution plate 3 are such that with each angular displacement of the gears 36 and 37 corresponding to one inching movement on the part of the Geneva mechanisms 31 and 42, the two distribution plates 2 and 3 are made to rotate sufficiently to cover the distance between two successive holes.

Likewise, the ratio between the number of teeth in the two gears 58 and 59 for the conveyor plate 4, is such that with each angular displacement of the gear 58, corresponding to one inching movement on the part of the eight compartment Geneva mechanism 56, the conveyor plate 4 rotates sufficiently to cover the distance between two successive holes.

According to one of the characteristics of the invention, 12 compartment Geneva mechanisms have been used for the two distribution plates 2 and 3, whilst for the conveyor plate 4, an eight compartment Geneva mechanism has been used. It should now be noted that an eight compartment Geneva mechanism undergoes a 45° rotation in order to cover the distance between two successive compartments, corresponding to a rotation of 135° on the part of the shaft used to operate it and that it stays at a standstill for the remaining 225° rotation needed for the said shaft to complete one cycle. A twelve compartment Geneva mechanism, instead, undergoes a 30° rotation in order to cover the distance between two successive compartments, corresponding to a rotation of 150° on the part of the shaft used to operate it and stays at a standstill for the remaining 210° rotation needed for the said shaft to complete one cycle (see FIG. 3).

This particular choice of Geneva mechanisms with a different number of compartments is, along with the set of gears previously described, directed at protracting the movement times of the two distribution plates 2 and 3 compared with those of the conveyor plate 4 and this is in accordance with what was stated earlier on.

In fact, assuming a unit of time to be, for example, the time taken by the gear 23 to complete a rotation through 360°, it can be seen that it takes a twelve compartment Geneva mechanism longer to effect one inching movement than it does an eight compartment Geneva mechanism.

As can be seen from the graph in FIG. 3, the two distribution plates 2 and 3 revolve synchronously.

Upon completion of each cycle corresponding to a rotation through 360° of the shaft 16 during which, as stated above, the plates 2 and 3 undergo one single contemporaneous displacement and the plate 4, two, the three plates commence a joint pause in their movement (see FIG. 3).

At this stage, the transfer operation is performed by the two lifting members 61 and 62 which raise the objects from the holes 5 in the distribution plates 2 and 3 up into the holes 6 in the conveyor plate 4 which are aligned vertically above the said holes 5.

The aforementioned lifting members 61 and 62 are mounted on the vertical rods 63 and 63', respectively, the lower extremity of which is rigidly fastened to the rods 64 and 64', respectively, and these, in turn, have their other end rigidly secured to one end of the shafts 65 and 65', respectively, the other end of which, through the links 66 and 66', respectively, is connected to one end of the two armed levers 67 and 67', respectively, pivoted to the shafts 68 and 68', respectively, carried by the frame 1 of the device.

The end of the second arm of the said levers 67 and 67', respectively, carries the idle rollers 69 and 69', respectively, which engage in the race in the previously mentioned cams 19 and 17, respectively.

The objects, raised two at a time per cycle into the holes 6 in the conveyor plate 4, are initially held in this position by the lifting members 61 and 62 which, having come to the end of their travel, are at a standstill.

Once the conveyor plate 4 is set in motion and rotates in, as previously stated, a clockwise direction, the two objects held inside its holes 6 are transferred from the surface of the lifting members 61 and 62 on to the fixed surface 14.

When the conveyor plate 4 next moves, no object is transferred, as can be seen from the graph on FIG. 3, from the distribution plates 2 and 3 to the conveyor plate 4 and thus the two lifting members 61 and 62 remain inoperative in their downward position.

Once this movement has been completed, the hole 6 in the conveyor plate 4, at a point corresponding to the transfer area where the lifting member 62 operates, is occupied by an object previously transferred therein by the lifting member 61. For this reason and in order to prevent the said object, unsupported by the lifting member 62, from falling out of the said hole 6, the previously mentioned oscillating plate 15 is inserted in the transfer area where the fixed surface 14 is interrupted, between the plates 3 and 4, for the purpose of the said oscillating plate 15 being to render the surface 14 continuous and thus to support the object in the said area, until the conveyor plate 4 next moves.

The said oscillating plate 15 is pivotally secured, via an arm 70, to a vertical shaft 71 from which its movement is derived.

The lower end of the said shaft 71 is integral with a lever 72, the other end of which is provided with a roller 73 which engages in the race in the previously mentioned cam 18.

The transfer of the objects to the wrapping machine is carried out, as stated, during the phases when the conveyor plate 4 is at a standstill (see FIG. 3), by a unit having the same operating frequency as the said conveyor plate 4.

Each of the ends of the shaft 16 fixedly carries, on the outside of the frame 1, a gear 74 and 74', respectively, and these serve to transmit the drive on to the rotating brushes 9.

The said gears 74 and 74' mesh with the gears 75 and 75', respectively, thereby causing the rotation of the two vertical shafts 76 and 76', respectively carried by fixed supports on the frame 1 of the device.

The upper ends of the said shafts 76 and 76', through the pairs of gears 77–78 and 77'–78', respectively, cause the rotation, in turn, of the horizontal shafts 79 and 79', respectively, on which the rotating brushes 9 are mounted.

What is claimed is:

1. A device for coordinating and feeding separately objects, particularly sweets and similar, to a wrapping machine, comprising: a plurality $n$ of distribution units and one conveyor unit, each of said units having a plurality of equidistant peripheric holes; means cyclically cylindrivally operating said conveyor unit and said $n$ distribution units so that the start/stop frequency ratio per cycle is $n:1$ and that the distribution units have long movement times and brief pauses and the conveyor unit has brief movement times and long pauses.

2. A device according to claim 1, including means whereby said $n$ distribution units are moved synchronously.

3. A device according to claim 1, wherein said $n$ distribution units and said conveyor unit are constituted by plates, each having a shaft and being rotatable around the shaft said holes being circumferential and equidistant in said plates; said operating means comprising a drive shaft, a second shaft, a crown wheel and pinion for transmitting motion from said drive shaft to said second shaft, a first gear mounted on said second shaft a second gear and a third gear having a teeth ratio of one half and 1:1, respectively, compared with said first gear and meshing with it, a fourth gear meshing with said third gear and having a teeth ratio of 1:1 compared with it; a third, fourth and fifth shaft moved by the second, third, and fourth gear, respectively; a sixth shaft moved, via a pair of gears, by the aforementioned third shaft; a first, second and third idle roller carried by said sixth, fourth and fifth shaft, respectively; an eight compartment Geneva mechanism made to move by said first idle roller; two 12 compartment Geneva mechanisms made to move by the second and third idle roller, respectively; said third shaft as well as two auxiliary shafts working in conjunction with the fourth and fifth shafts, respectively, and being shaped in such a way as to act as the stabilizing member for the three aforementioned Geneva mechanisms.

* * * * *